(12) United States Patent
Marais et al.

(10) Patent No.: US 11,724,889 B2
(45) Date of Patent: Aug. 15, 2023

(54) NIP GUARD

(71) Applicant: Brelko Patents (Pty) Ltd, Johannesburg (ZA)

(72) Inventors: Jacques Marais, Johannesburg (ZA); Paul Christian, Johannesburg (ZA)

(73) Assignee: Brelko Patents (Pty) Ltd, Johannesburg (ZA)

( * ) Notice: Subject to any disclaimer, the term of this patent is extended or adjusted under 35 U.S.C. 154(b) by 3 days.

(21) Appl. No.: 17/603,398

(22) PCT Filed: Apr. 15, 2020

(86) PCT No.: PCT/IB2020/053545
§ 371 (c)(1),
(2) Date: Oct. 13, 2021

(87) PCT Pub. No.: WO2020/212860
PCT Pub. Date: Oct. 22, 2020

(65) Prior Publication Data
US 2022/0185595 A1    Jun. 16, 2022

(30) Foreign Application Priority Data

Apr. 16, 2019    (ZA) .................. 2019/02405

(51) Int. Cl.
*B65G 45/12*    (2006.01)
*B65G 21/00*    (2006.01)

(52) U.S. Cl.
CPC ............. *B65G 45/12* (2013.01); *B65G 21/00* (2013.01); *B65G 2207/40* (2013.01)

(58) Field of Classification Search
CPC ........ B65G 45/12; B65G 45/14; B65G 45/16; B65G 21/00; B65G 2207/40
See application file for complete search history.

(56) References Cited

U.S. PATENT DOCUMENTS 1,729,322 A * 9/1929 Barber ................. B65G 43/00
                                                                   198/497
1,791,482 A * 2/1931 Thomas ............... B65G 45/14
                                                                   198/606

(Continued)

FOREIGN PATENT DOCUMENTS

DE         3224557 A1    1/1984
IT    RN20110007 A1    8/2012

(Continued)

OTHER PUBLICATIONS

International Search Report and Written Opinion for Application No. PCT/IB2020/053545 dated Jul. 30, 2020 (11 pages).

(Continued)

*Primary Examiner* — Mark A Deuble
(74) *Attorney, Agent, or Firm* — Michael Best & Friedrich LLP

(57) ABSTRACT

A nip guard (10) for use with a conveyor system which includes a pulley (84) and a flexible conveyor belt (88) which is engaged with and which passes over the pulley (84), the conveyor belt (88) including an outer load-carrying surface (82) and an inner surface (86), wherein the nip guard (10) includes supporting structure (64, 66, 60) and, mounted to the supporting structure (60, 64, 66), at least one belt scraping element (46) configured to be in scraping contact with the inner surface (86) of the belt (88).

7 Claims, 4 Drawing Sheets

(56) References Cited

U.S. PATENT DOCUMENTS

| | | | | |
|---|---|---|---|---|
| 1,933,485 | A * | 10/1933 | Rund | B65G 45/12 |
| | | | | 198/499 |
| 3,865,232 | A * | 2/1975 | Koenig | B65G 45/12 |
| | | | | 198/497 |
| 4,202,437 | A * | 5/1980 | Gordon | B65G 45/12 |
| | | | | 198/497 |
| 4,696,388 | A * | 9/1987 | Stoll | B65G 45/12 |
| | | | | 198/497 |
| 4,944,386 | A * | 7/1990 | Swinderman | B65G 45/12 |
| | | | | 15/256.5 |
| 6,152,290 | A * | 11/2000 | Mott | B65G 45/16 |
| | | | | 198/499 |
| 6,695,123 | B2 * | 2/2004 | Stoll | B65G 45/12 |
| | | | | 198/497 |
| 9,517,894 | B2 * | 12/2016 | Hartney | B65G 45/12 |
| 11,440,737 | B2 * | 9/2022 | Brunone | B65G 15/08 |
| 2007/0272518 | A1 * | 11/2007 | Gaarden | B65G 45/12 |
| | | | | 198/499 |
| 2022/0185592 | A1 * | 6/2022 | Ni | B65G 45/12 |

FOREIGN PATENT DOCUMENTS

| | | |
|---|---|---|
| JP | S52144590 U | 11/1977 |
| JP | S5342389 U | 4/1978 |
| JP | 2000007135 A | 1/2000 |
| JP | 2011219257 A | 11/2011 |
| JP | 2018047961 A | 3/2018 |

OTHER PUBLICATIONS

Cheng et al., "Design Principles of Slotted Holes", Proceedings of the International MultiConference of Engineers and Computer Scientists 2015 vol. II, Mar. 18, 2015, pp. 1-5.

* cited by examiner

NIP GUARD

CROSS-REFERENCE TO RELATED APPLICATIONS

The present application is a U.S. National Phase application of PCT/IB2020/053545 filed Apr. 15, 2020, which claims priority to South African Application No. ZA 2019/02405 filed Apr. 16, 2019, the entire contents of both of which are herein incorporated by reference.

BACKGROUND OF THE INVENTION

This invention relates to nip guard i.e. to a barrier which is installed across a width of a conveyor belt to prevent a person from reaching a nip point.

A nip point is a dangerous pinch zone which occurs at a line of contact between a rotating pulley of a conveyor belt system, and a moving conveyor belt on the in—running side of the pulley.

FIG. 1 of the accompanying drawings illustrates a typical nip guard arrangement. A length of angle iron 10 is positioned across a width of a conveyor belt 12 with a flange 14 of the angle iron parallel to and spaced from an inner surface 16 of the belt. A second flange 20 extends vertically. An outer surface of the horizontal flange is spaced from the inner surface of the belt by a distance D. Typically, an upper edge of the flange is spaced from the opposing surface of the pulley by a similar distance D. The nip guard 10 should be fixed to supports in such a way that the distances D between the guard and the pulley and between the guard and the belt surface do not vary even if the belt is tensioned.

It has been found that despite an initial strict compliance with regulation, accidents do occur at nip points. If material is lodged, at the nip point, between opposing surfaces of the belt and the pulley, an operator may be inclined to insert a hand into the nip point to release the material—an exercise which can lead to serious injury or death if the conveyor belt then moves due, for example, to tension release in the belt.

The weight of the load carried by the conveyor belt invariably causes the belt to deform such that, in cross-section, the belt takes on a curved or sinuous shape. As a result, the distance between the nip guard and an inner surface of the belt may vary across a width of the conveyor belt, which could lead to unsafe conditions at the nip point over time.

An object of the present invention is to provide an improved nip guard which addresses the aforementioned problems.

SUMMARY OF THE INVENTION

The invention provides a nip guard for use with a conveyor system which includes a pulley and a flexible conveyor belt which is engaged with and which passes over the pulley, the conveyor belt including an outer load-carrying surface and an inner surface, wherein the nip guard includes supporting structure and, mounted to the supporting structure, at least one belt scraping element configured to be in scraping contact with the inner surface of the belt.

The support structure may comprise spaced apart first and second brackets configured to be mounted to external structure with an elongate support between the first and second brackets. The spacing between the first and second brackets may be variable at least to a limited extent to enable the support structure to be secured to the external structure.

The at least one belt scraping element may include an elongate body with a first end and an opposed second end, a first side and an opposing second side which presents an elongate belt scraping edge. The body of the belt scraping element may be deformable, at least to a limited extent, to enable the elongate belt scraping edge to follow a curved or sinuous path such that it contacts the inner surface of the conveyor belt.

The at least one belt scraping element may be formed from any suitable deformable material e.g. ultra-high-molecular-weight polyethylene, polyurethane, or rubber. The invention is not limited in this respect.

In an alternative arrangement a plurality of belt scraping elements may be mounted to the support in an end-to-end abutting relationship. Each belt scraping element may include a respective belt scraping edge. Preferably, one belt scraping element is mounted to the support.

An adjustment means may be provided to vary the position of a portion of the elongate belt scraping element relative to the elongate support thereby to allow the elongate belt scraping edge to be moved towards or away from the inner surface of the conveyor belt according to requirement. As the element is deformable, at least to a limited extent, it can be deformably shaped, portion by portion, to move the scraping edge so that it follows, and preferably is in substantially continuous contact with, the inner surface of the conveyor belt.

The adjustment means may be of any suitable kind to shape or move the belt scraping element so that the scraping edge closely follows, and preferably is in contact with, the inner surface of the conveyor belt. The adjustment means may include a plurality of fasteners at spaced apart locations on the elongate support engageable with the belt scraping element.

In instances where only one belt scraping element is used, the adjustment means may also include a plurality of corresponding spaced apart locating formations, engageable with the plurality of fasteners. The positions of the fasteners within the locating formations may be varied according to requirement to adjust the distance between the elongate belt scraping edge and the inner surface of the belt along a width of the conveyor belt.

The locating formations may be in the form of slots formed in the body of the belt scraping element. Additionally or alternatively, the locating formations may be in the form of nuts fixed to the support which are threadedly engageable with the fasteners. An end of each fastener may abut against the first side of the belt scraping element. Movement of the fastener relative to the nut causes the fastener to move in a direction towards or away from the belt scraping element, thereby causing the belt scraping edge to be urged towards or away from the inner surface of the conveyor belt according to requirement.

Preferably, at each end of the support, a respective fastener which is threadedly engageable with a nut is provided. The remaining fasteners may be engageable with slots formed in the body of the belt scraping element.

BRIEF DESCRIPTION OF THE DRAWINGS

The invention is further described by way of example with reference to the accompanying drawings in which.

DESCRIPTION OF PREFERRED EMBODIMENTS

Figure 1:
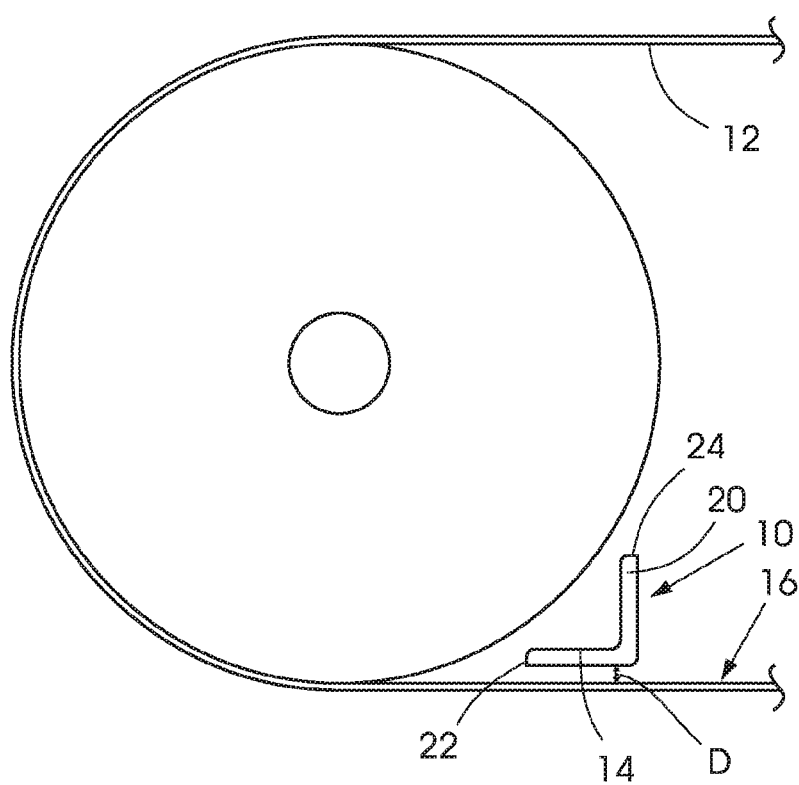
Figure 2:
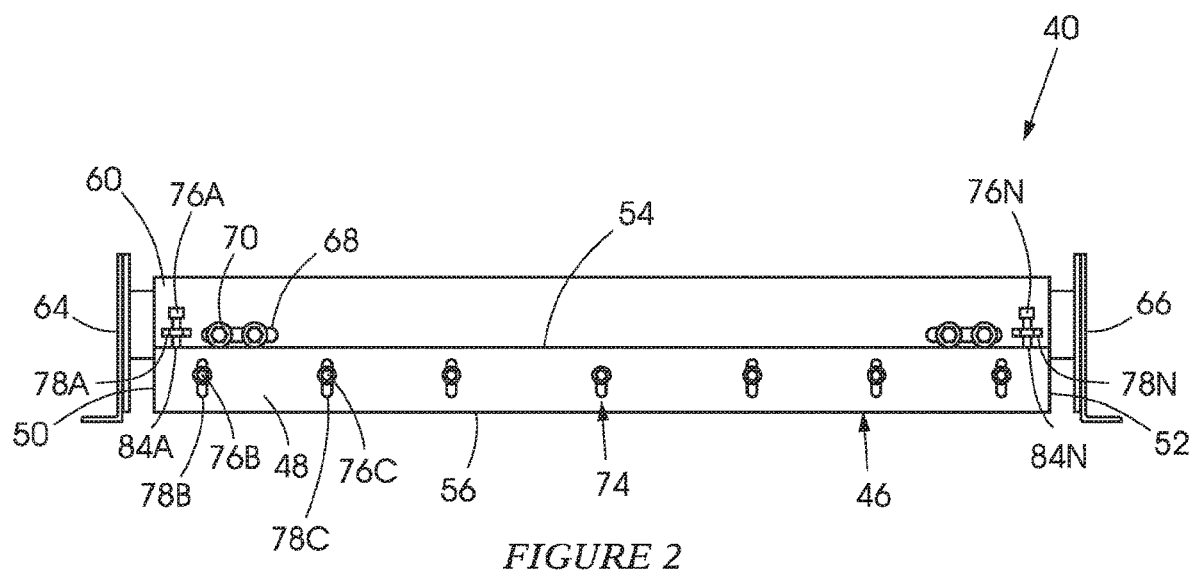
FIG. 2 is a front view of a nip guard according to one form of the invention.

FIG. 2 of accompanying drawings illustrates a nip guard 40 according to the invention.

The nip guard 40 includes a belt scraping element 46 which is fixed to a support structure which includes first and second brackets 64, 66 and an elongate support 60 between them. The spacing between the brackets 64 and 66 can be adjusted to some extent through the use of slots 68 in the support 60 and bolts 70 which are slideably engaged with the slots 68.

The elongate belt scraping element 46 includes an elongate body 48 with a first end 50, an opposing second end 52, a first side 54 and an opposing second side which presents a belt scraping edge 56.

Although only one belt scraping element 46 is depicted, it should be appreciated that more than one belt scraping element may be mounted to the support 60 and the invention is not limited in this respect.

The elongate body 48 is formed from a deformable material e.g. ultra-high-molecular-weight-polyethylene, polyurethane or rubber to allow the belt scraping edge 56 to contact an inner surface of a conveyor belt (shown in FIG. 2) in use.

An adjustment means 74 is provided to allow the belt scraping edge 56 to follow a curved or sinuous path, which mimics and closely follows the opposing surface of the conveyor belt. In this case the adjustment means comprises a plurality of fasteners 76A, 76B, 76C . . . 76N at spaced apart locations on the elongate support 60. Engageable with the plurality of fasteners 76A, 76B, 76C . . . 76N are a plurality of spaced apart corresponding locating formations 78A, 78B, 78C . . . 78N.

At opposing ends of the support 60, designated 80 and 82 respectively, the locating formations 78A and 78N are in the form of nuts fixed to the support 60. The fasteners 76A, 76N are threadedly engageable with the nuts 78A, 78N and at each end the nuts 78A, 78N, designated 84A and 84N respectively, abut against the edge 54 of the belt scraping element 46. The remaining locating formations are in the form of slots 78B, 78C, 78D etc. formed in the body 48 of the belt scraping element 46.

Figure 3:
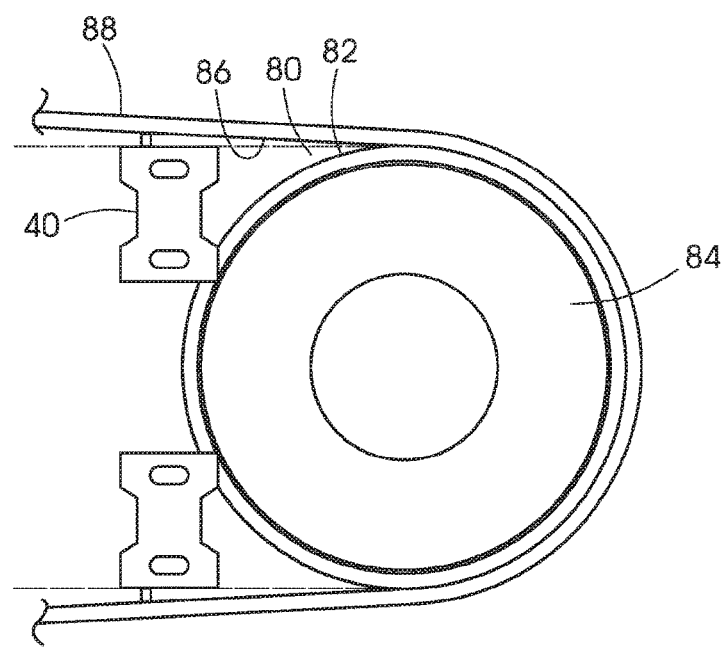
FIG. 3 is a side view in cross-section of a conveyor system which includes a pulley and a conveyor belt wherein two nip guards, each according to FIG. 2, are installed.

The nip guard 40 is designed to be used in the manner shown in FIG. 3 at a nip point 80 between an outer surface 82 of a pulley 84, and an inner surface 86 of a flexible conveyor belt 88 which passes around the pulley 84. The brackets 64 and 66 are also fixed to external support structure, not shown. In this way the nip guard 40 is located at the nip point 80. The nip guard 40 is positioned so that an edge 90 of the elongate support 60 is slightly spaced from the outer surface 82 of the pulley 84 across the width of the pulley 84. The belt scraping edge 56 is in scraping contact with an inner surface 86 of the belt 88.

When the belt 88 is substantially planar in cross-section, the adjustment means 74 has the shape shown in FIG. 2, to ensure that the belt scraping edge 56, which is essentially in a straight line, is in contact with the inner surface 86 of the belt 88.

Figure 4:
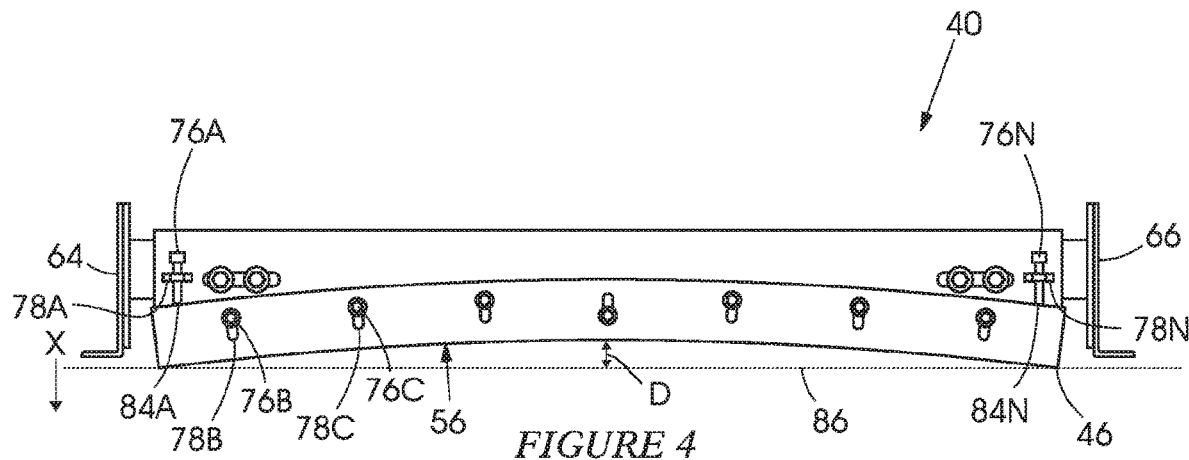
FIG. 4 is a front view of the nip guard in FIG. 2 which has been adjusted according to the invention.
Figure 5:
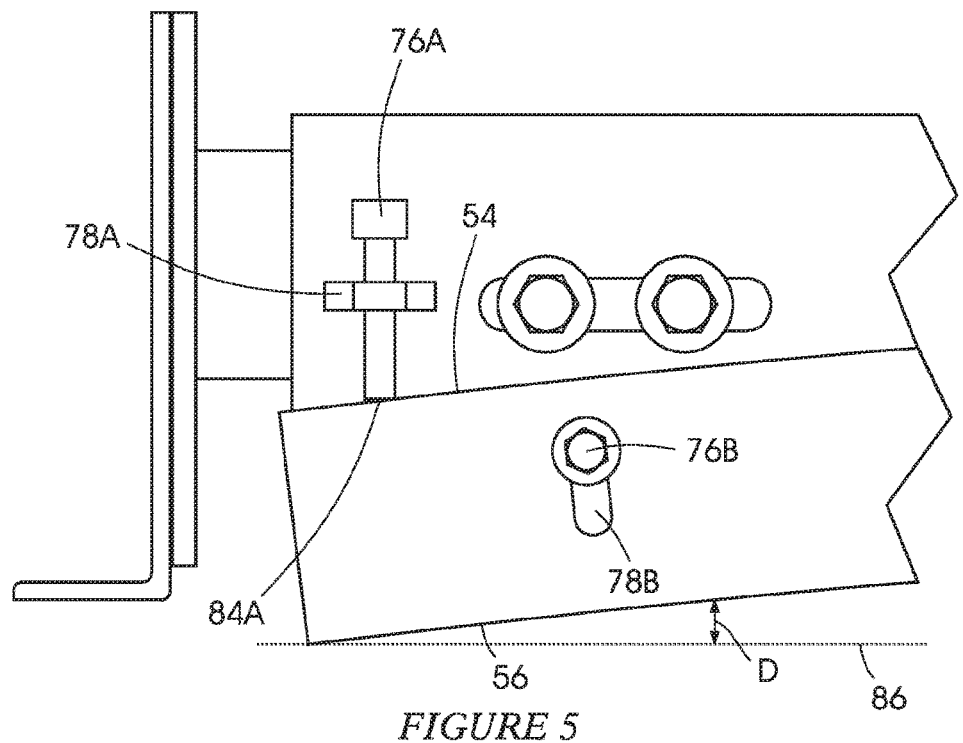
FIG. 5 is an enlarged view of a portion of the nip guard in FIG. 4.

As the belt 88, in cross-section, takes on a curved or sinuous shape during use, the belt scraping edge 56 is adjusted such that it contacts the inner surface 86 of the belt 88 (see FIGS. 4 and 5). The fasteners 76A and 76N are rotated relative to the nuts 78A, 78N to cause the respective ends 84A and 84N of each fastener 76A, 76N to move towards the edge 54 of the body 48 of the belt scraping element 46. In this example, the ends 50 and 52 of the belt scraping element 46 are urged in a direction shown by an arrow designated X.

The positions of the fasteners 76B, 76C, 76D etc. within the slots 78B, 78C, 78D etc. are varied by loosening each respective fastener and repositioning the belt scraping element 46 until a desired distance D between the belt scraping edge 56 and the inner surface 86 of the conveyor belt 88 is reached. Each fastener 76B, 76C, 76D etc. is then fixed in place. Thus the element is deformed so that the edge 56 closely follows the surface 86, and the element is then locked in position in the deformed state.

Figure 6:
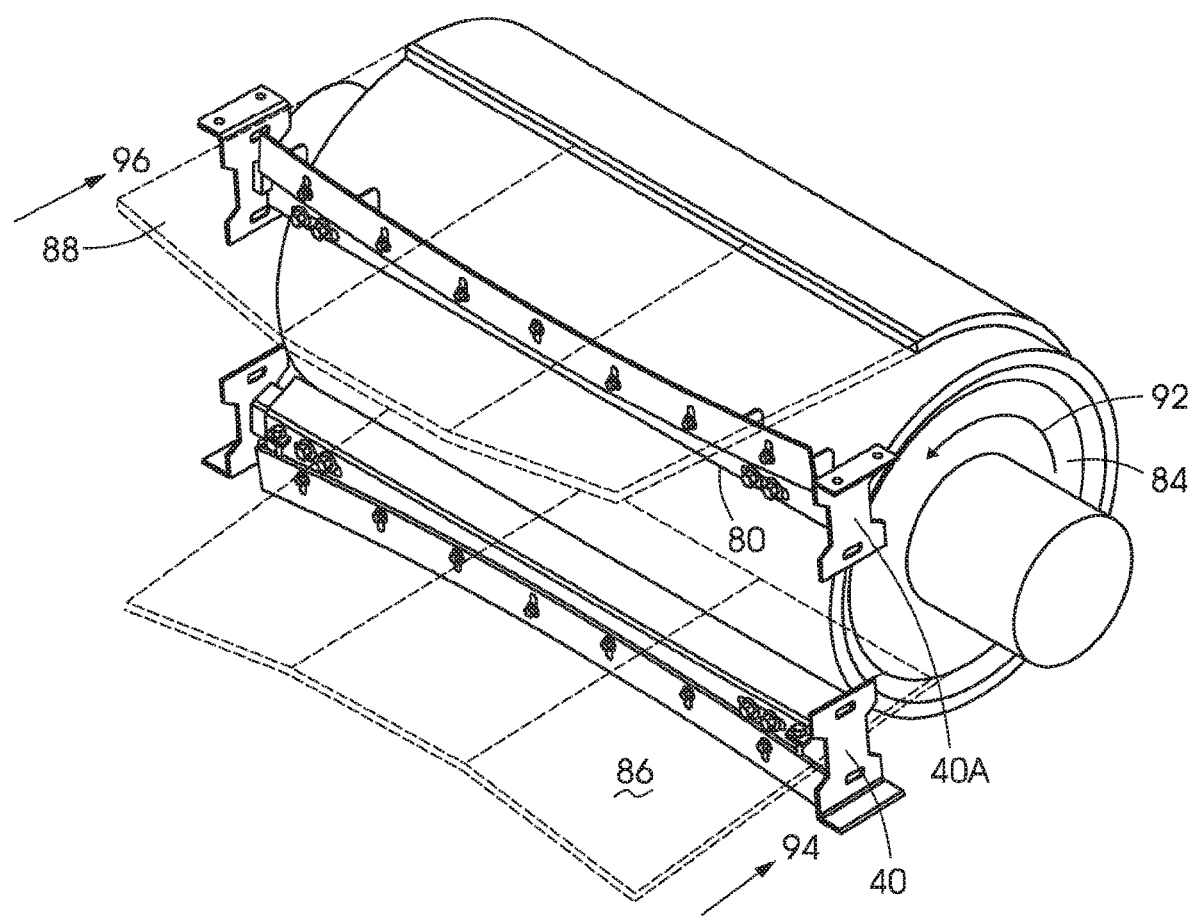
FIG. 6 is a perspective view of a conveyor system which includes a pulley and a conveyor belt wherein two nip guards, each according to FIG. 2, are installed.

In the installation shown in FIG. 6 a second nip guard 40A is installed at an upper nip point 80. The nip guard 40A is for all practical purposes the same as the nip guard 40. The installation procedure is substantially the same. The nip guard 40 is employed, in particular, to cover the situation in which the pulley 84 rotates in a direction 92 with the result that the inner surface 86 on the lower run of the belt 88 moves in the direction of an arrow 94. The nip guard 40A is used if the rotation direction 92 is reversed, in which event the upper run of the belt would be movable in a direction 96.

The close placement of the belt scraping edge against the inner surface of the belt, adjacent the nip point, means that for all practical purposes the likelihood that foreign material can enter the nip point is eliminated. If material does enter the nip point it is practically impossible for a human to insert an object into the nip point without releasing the nip guard. This aspect can be further enhanced by covering the small gap on each side of the nip guard so that human access is prevented.

Furthermore, the ability to adjust the distance between the belt scraping edge and the inner surface of the conveyor belt across the width of the belt, allows the belt scraping edge to conform to and follow the profile of the inner surface of the conveyor belt, enhancing the safety of the nip guard.

What is claimed is:

1. A nip guard (10) for use with a conveyor system which includes a pulley (84) and a flexible conveyor belt (88) which is engaged with and which passes over the pulley (84), the conveyor belt (88) including an outer load-carrying surface (82) and an inner surface (86), wherein the nip guard (10) includes supporting structure (64, 66, 60) and, mounted to the supporting structure (60, 64, 66), at least one belt scraping element (46) which includes an elongate body (48) with a first end (50) and an opposed second end (52), a first side (54) and an opposing second side which presents an elongate belt scraping edge (56) and wherein the body (48) is deformable, at least to a limited extent, to enable the elongate belt scraping edge (56) to follow a curved or sinuous path which follows the inner surface (86) of the conveyor belt (88), wherein said supporting structure (60, 64, 66) comprises spaced apart first and second brackets (64, 66) configured to be mounted to external structure with an elongate support (60) between the first and second brackets (64, 66) wherein an edge of the elongate support is spaced from said outer surface of the pulley across the width of the pulley, and a plurality of fasteners which are engaged at spaced apart locations with the elongate support and said elongate body, wherein the fasteners are actuated thereby to deform the scraping element relative to the elongate support (60) thereby to allow the scraping edge (56) to move towards or away from the inner surface (86) of the conveyor belt (88) so that a desired distance is reached between said scraping edge and said inner surface.

2. A nip guard (10) according to claim 1 wherein the deformable material is selected from ultra-high-weight polyethylene, polyurethane or rubber.

3. A nip guard (10) according to claim 1 wherein the body (48) is formed with a plurality of spaced apart locating formations each of which comprises a respective slot and the fasteners are respectively engaged with the slots.

4. A nip guard (10) according to claim 1 wherein the elongate belt scraping edge (56) is spaced apart from the inner surface (86) of the conveyor belt (88).

5. A nip guard (10) according to claim 1 wherein the first bracket (64) blocks a portion of a nip point formed by conveyor belt (88) and the pulley (84) to inhibit a user from inserting a hand into the nip point.

6. A nip guard (10) according to claim 1 wherein the second bracket (66) blocks a portion of a nip point formed by conveyor belt (88) and the pulley (84) to inhibit a user from inserting a hand into the nip point.

7. A nip guard (10) for use with a conveyor system which includes a pulley (84) and a flexible conveyor belt (88) which is engaged with and which passes over the pulley (84), the conveyor belt (88) including an outer load-carrying surface (82) and an inner surface (86), wherein the nip guard (10) includes supporting structure (64, 66, 60) and, mounted to the supporting structure (60, 64, 66), at least one belt scraping element (46) which includes an elongate body (48) with a first end (50) and an opposed second end (52), a first side (54) and an opposing second side which presents an elongate belt scraping edge (56) and wherein the body (48) is deformable, at least to a limited extent, to enable the elongate belt scraping edge (56) to follow a curved or sinuous path which follows the inner surface (86) of the conveyor belt (88), wherein said supporting structure (60, 64, 66) comprises spaced apart first and second brackets (64, 66) configured to be mounted to external structure with an elongate support (60) between the first and second brackets (64, 66) wherein an edge of the elongate support is spaced from said outer surface of the pulley across the width of the pulley, and a plurality of fasteners which are engaged at spaced apart locations with the elongate support and said elongate body, wherein the fasteners are actuated thereby to deform the scraping element relative to the elongate support (60) thereby to allow the scraping edge (56) to move towards or away from the inner surface (86) of the conveyor belt (88) so said scraping edge is spaced apart from said inner surface.

* * * * *